United States Patent
Koderman

[11] 3,886,805
[45] June 3, 1975

[54] CRANK GEAR FOR THE CONVERSION OF A TRANSLATIONAL MOTION INTO ROTATION

[76] Inventor: Ivan Koderman, Nadgorica/Jeza 95 61231 Lubliana, Crnuce, Yugoslavia

[22] Filed: Apr. 9, 1974

[21] Appl. No.: 459,281

[52] U.S. Cl.............. 74/52; 74/804; 123/197 AC; 123/90.31
[51] Int. Cl............................................ F16h 37/12
[58] Field of Search ...... 74/52, 42, 804; 123/197 R, 123/197 AC, 90.23, 90.31, 55 R, 55 AA

[56] References Cited
UNITED STATES PATENTS

| | | | |
|---|---|---|---|
| 587,380 | 8/1897 | Ziegler | 74/52 |
| 634,194 | 10/1899 | Woodward | 74/52 |
| 1,061,098 | 5/1913 | McKeen, Jr. | 123/90.31 |
| 1,155,044 | 9/1915 | Cobb | 123/90.31 |
| 2,515,616 | 7/1950 | Thomas | 74/52 |

Primary Examiner—Wesley S. Ratliff, Jr.
Attorney, Agent, or Firm—Dennison, Dennison, Townshend & Meserole

[57] ABSTRACT

A crank gear for multicylinder engines having connecting rods rigidly attached to the pistons and journaled on a rotating planetary crankshaft which is eccentrically supported. An external gear is mounted on one of the crankpins and hobs on a stationary internal gear mounted concentrically with respect to the entire crank gear; the number of teeth on the internal gear being twice the number of teeth of the external gear.

4 Claims, 10 Drawing Figures

CRANK GEAR FOR THE CONVERSION OF A TRANSLATIONAL MOTION INTO ROTATION

This invention is directed to a crank gear for the conversion of a translational motion into rotation and vice versa, usable for any type of multicylinder engines.

Crank mechanisms for the conversion of a linear movement into rotation is well known (e.g., the crank gear of an internal combustion engine). Moreover, a gear for the conversion of a linear movement into a rotation, used as crank gear with a crosshead for steam engines is also well known in the art.

The disadvantage common to these gears is the deflection of the connecting rods; however, if a two-sided operation of the piston is required for a certain application, a bulky crosshead has to be used.

Furthermore, there exists a mechanism for internal combustion engines after a design from Balandin consisting of two pairs of pistons that are rigidly attached to each other with a connecting rod. Each of these connecting rods is guided with slide rings in the corresponding sliding guides which are in a 90° angle relative to each other mounted in the center of the structure. Each of these slide rings is designed as a sliding bearing for the planetary crank gear which in turn is supported by end journals in the center of the planetary gear mounted eccentrically into the external gears on both sides. The planetary crank gear drives the two gears mentioned before which are supported in the center of the mechanism and contain a drive shaft in their center. Both gears are attached to an additional shaft by a gearing to cushion the resulting torque.

The shortcomings of the mechanism explained above are mainly the change of direction of the slide rings, which implies also a change of the resulting oil film, and its very high speed at the driven shaft which is actually not required in a practical application of such a drive.

It is the purpose of this invention to design a crank gear without the disadvantages of the presently known gears, to convert a linear movement into rotation using less parts and to allow a compact construction requiring minimum space, to convert the translational movement of the pistons into rotation by a fixed connecting rod and a planetary crank drive, and thus allowing a two-sided operation of the pistons as well as a transmission without straight sliding guides, thus also reducing the number of parts. Moreover, the design according to the invention ensures a sufficient reduction of the speed of the planetary crankshaft and therefore a corresponding speed at the driven shaft.

These requirements are met by the crank gear according to the invention comprising a connecting rod which is rigidly attached to a piston, the connecting rod being supported in a rotating planetary crankshaft. This eccentrically supported crankshaft rotates because an external gear mounted on one of the crankpins hobs on an internal gear, mounted concentrically with respect to the whole mechanism; the number of teeth of the internal gear is twice the number of those of the external gear. The drive shaft mounted concentrically is set in motion by the eccentrically supported planetary crankshaft.

It is also feasible to employ a toothed driven shaft with internal or external gearing driven by the toothed end of the planetary crankshaft rotating around or within the geared driven shaft; this principle works because of the rotation of the crankshaft around the center of the mechanism (coupling) and the rotation around its own axis (hobbing). The crank gear according to the invention is explained in detail using practical examples with corresponding drawings.

Figure 1:
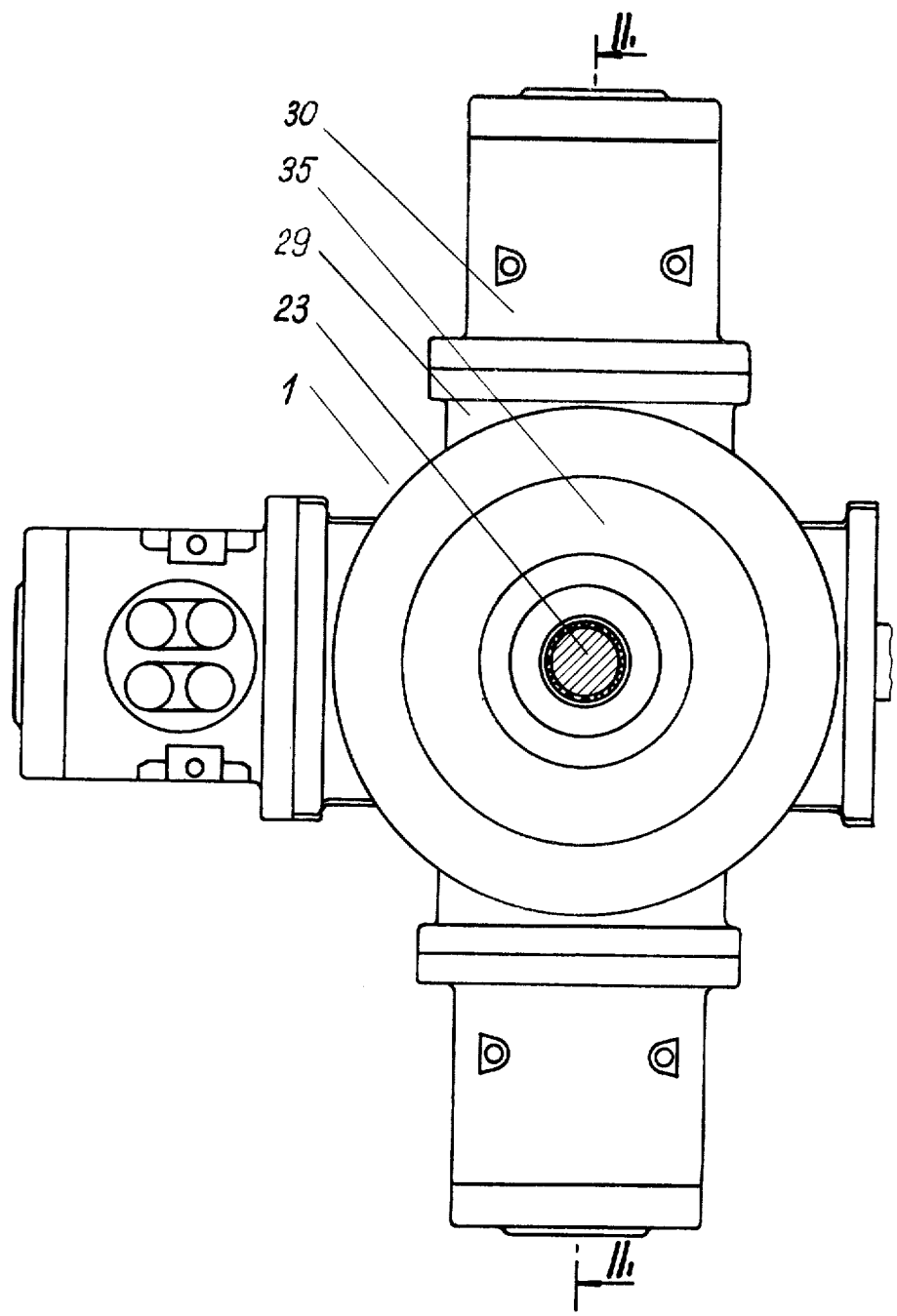
FIG. 1 is a front elevation of the crank gear.
Figure 2:
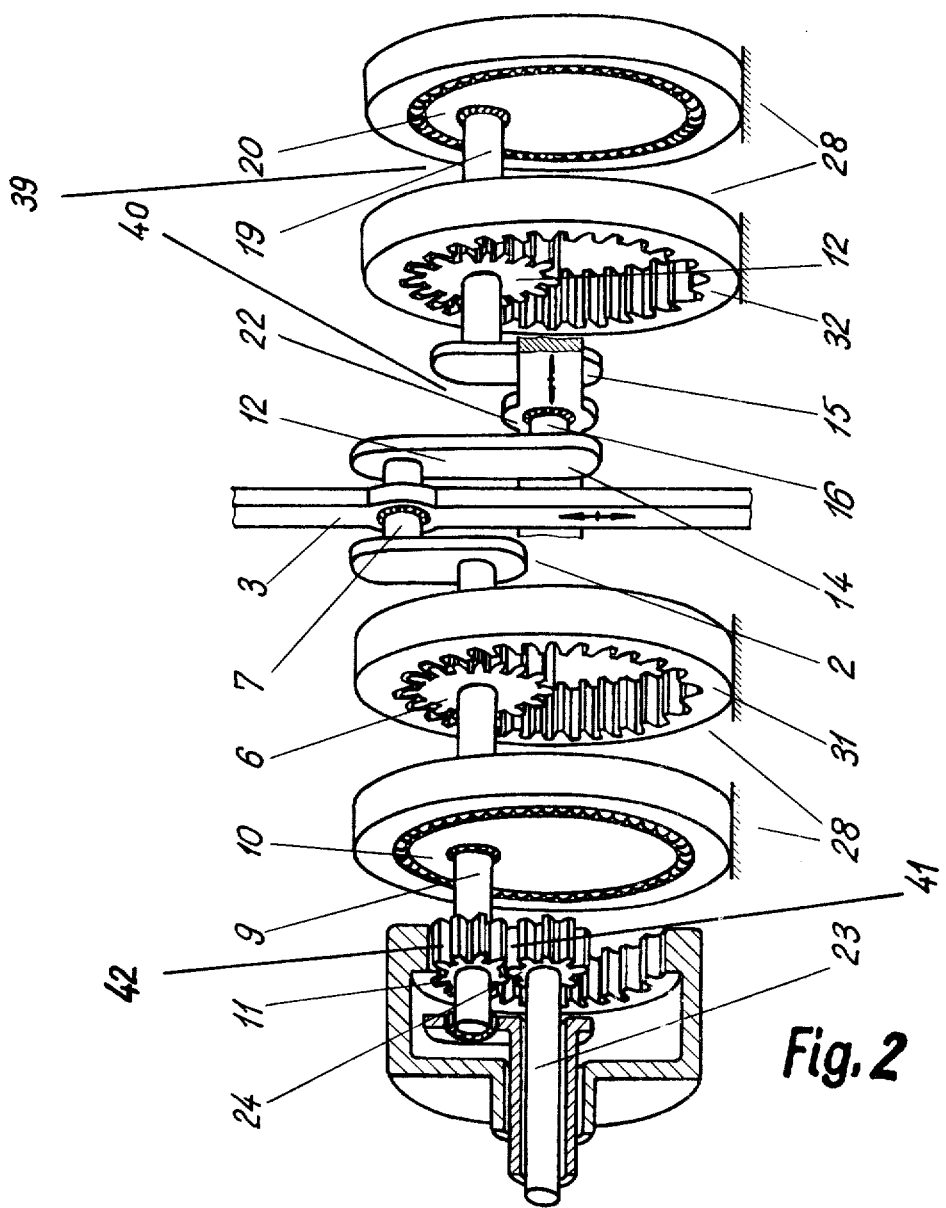
FIG. 2 is an exploded schematic axonometric view of the crank gear.
Figure 3:
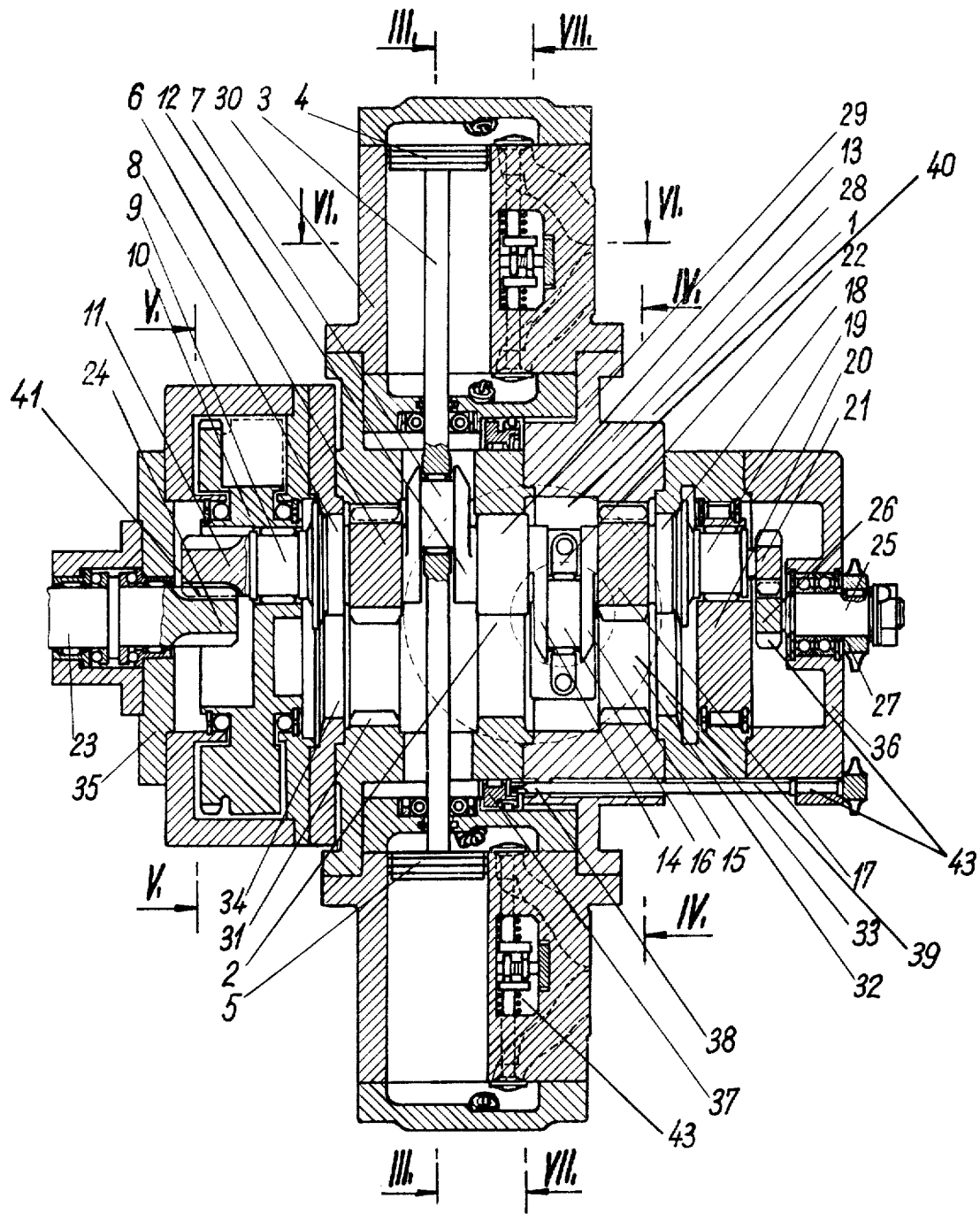
FIG. 3 is a sectional view taken on line II—II in FIG. 1.
Figure 4:
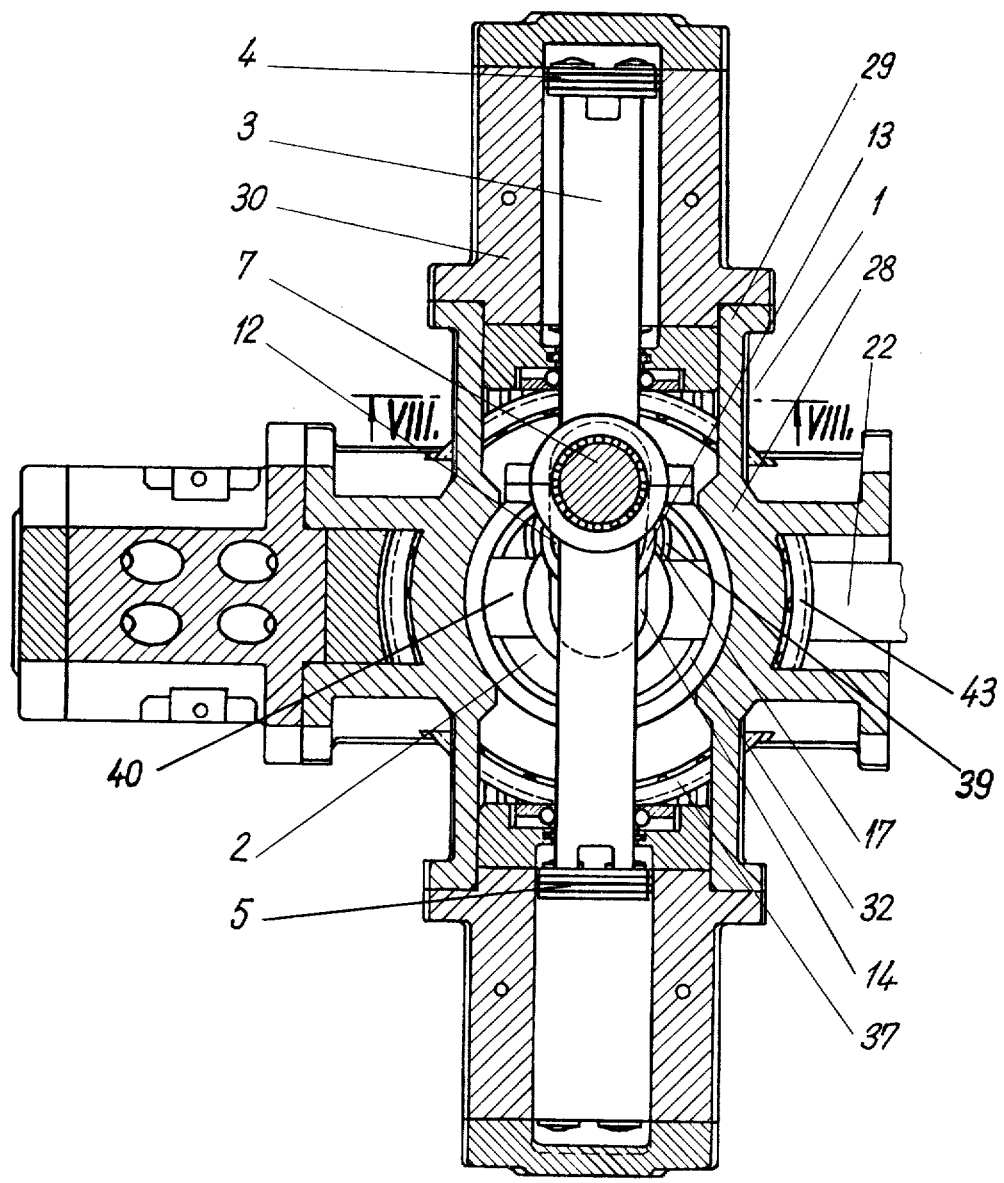
FIG. 4 is a sectional view taken on line III—III in FIG. 3.
Figure 5:
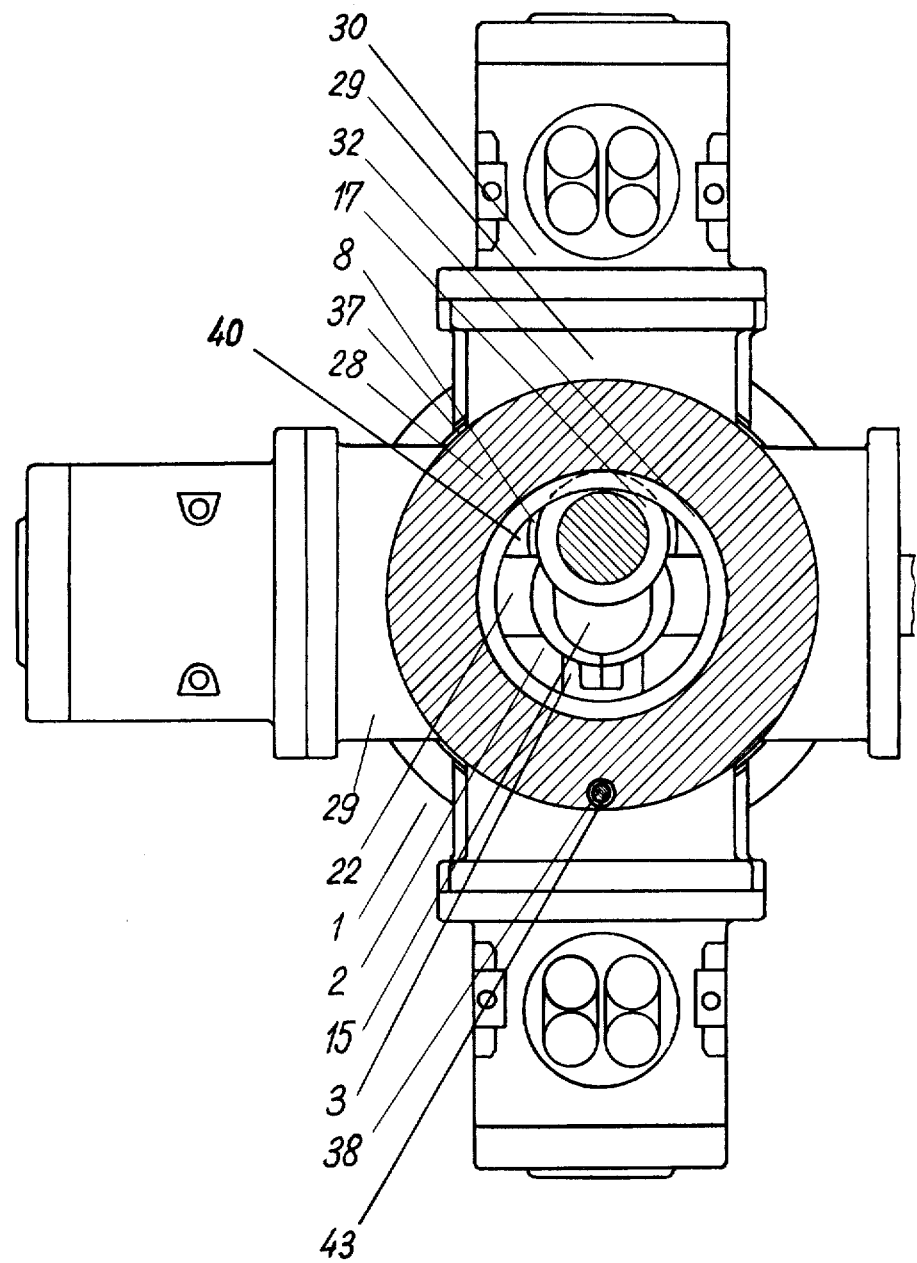
FIG. 5 is a sectional view taken on line IV—IV in FIG. 3.

FIGS. 1 through 5 show that the crank gear consists of a housing 1 containing a planetary crankshaft 2 with a rigidly attached external gear 6 mounted on the crank web of connecting rod 3 of the piston pair 4 and 5. The hob circle of this gear 6 has to intersect the center axis of the crankpin 7. A guide wheel 8 with a flange and a diameter equal to the hob diameter of gear 6 is mounted concentrically to this gear. A butt shaft end 9 is firmly attached to the guide wheel, bearing a gear 11 for the reduction of the speed if required, which is supported eccentrically in a concentrically supported fly-wheel 10 acting as a counterweight to the planetary crankshaft. Mounted to the crank web 12 of connecting rod 3 of the piston pair 4 and 5 is a guide wheel 13 with identical diameter to the pitch diameter of gear 6. A pair of crank webs 14 and 15 with a crankpin 16 are attached to this guide wheel similarly to the first pair mounted to connecting rod 3 and crank webs 12, they are, however, displaced by 180°. On the side opposite the driven shaft the pair of crank webs 14 and 15 are extended by an external gear 17 which is identical to gear 6; both gears have the same center axis. A guide wheel 18 is attached concentrically to this gear, analogously to guide wheel 8. A shaft butt 19 supported eccentrically in a concentrically mounted plate 20 with a small gear if necessary is fixed in the center of this guide wheel 18.

Figure 6:
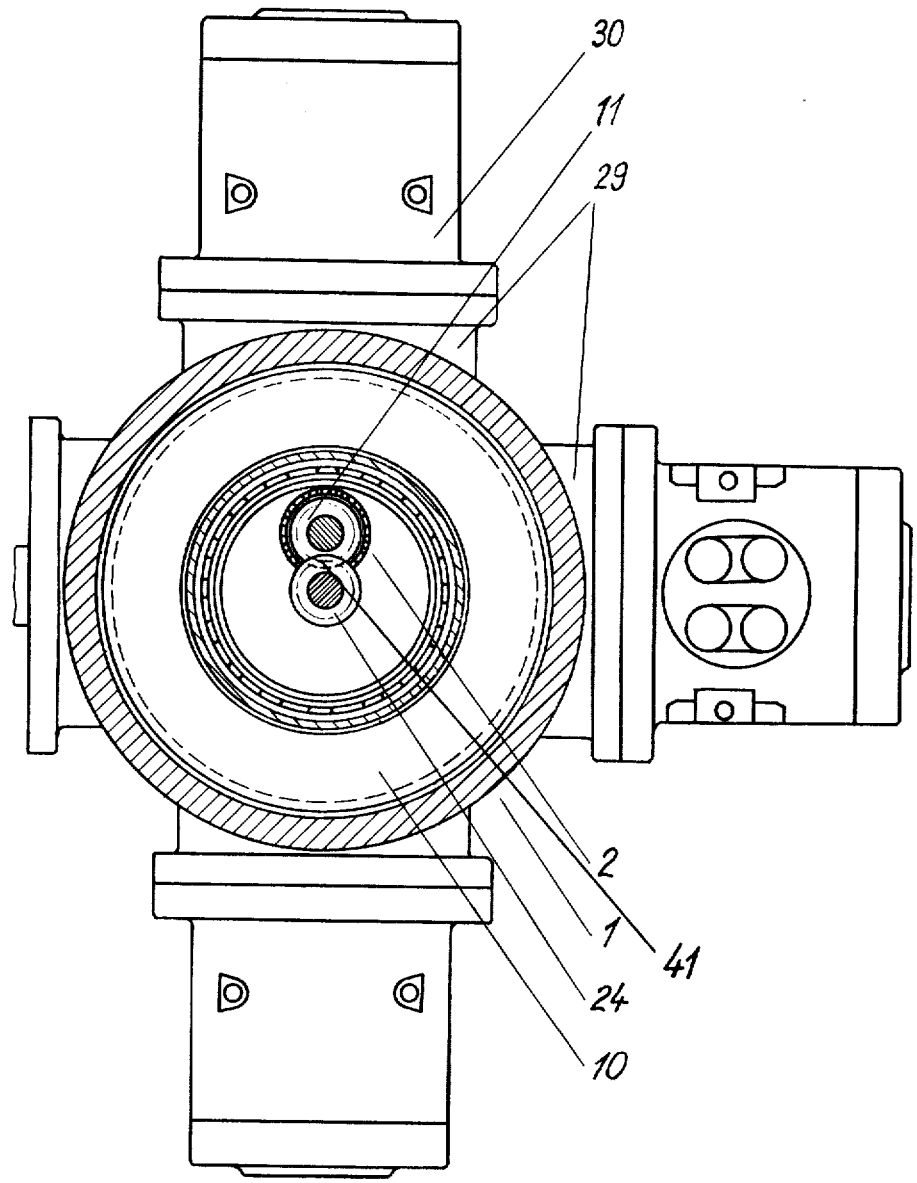
FIG. 6 is a sectional view taken on line V—V in FIG. 3.

The connecting rod 22 fixed to the other pair of pistons 4 and 5 is supported on the crankpin 16. On the power take-off side of the gear housing 1 (FIGS. 2, 6 and 10), the driven shaft 23 is supported concentrically. On the shaft end inside the housing either an external or internal gear 24 meshes with the toothed shaft butt 11 of the planetary crankshaft 2 or the shaft 23 is mounted directly to the center of the fly-wheel 10. On the shaft 25 protruding on the side opposite the power take-off, a chain wheel 27 is concentrically mounted. On the shaft end inside the housing there is either an external or internal gear 26 which is driven by the gear 21 mounted concentrically to the planetary crankshaft 2.

The housing consists of the cylinder shaped center part 28 and the adapters 29 spaced every 90° on the periphery for mounting the cylinders 30 of the pistons. The cylinder shaped center part 28 of the housing consists of a concentrically mounted guide ring with an inside diameter equal to two times the diameter of the guide wheel 18; two smaller rings extending to both sides of this guide ring contain rectangular openings arranged in a 90° angle to the axis, the centers of these openings corresponding to the axes of the connecting rods 3 and 22. The cylinder shaped center part 28 is then extended by two internal gears 31 and 32, the hob diameter being two times the hob diameter of the gears 6 and 17 (therefore the number of teeth of this ring is also twice the number of teeth of the gears 6 and 17). Two guide rings 33 and 34 with an internal diameter equal to the hob diameter of the internal gears 31 and 32 and two rim extensions are mounted outside these gears 31 and 32. The outer diameter of the housing 1 is larger on the power take-off side to provide space for the eccentric fly-wheel 10.

The housing 1 is closed on both sides by two covers 35 and 36. It is divided in the middle to allow the insertion of the cam ring 37 for the valve control; this cam ring is driven by the toothed end of the shaft 38, which is supported twice and bears a chain wheel on its other end.

A crank gear constructed according to the invention operates as follows: When the pistons 4 and 5 move from the top dead center to the bottom dead center the gear 6, and, for compensating the resulting torque, gear 17 in the mechanism 39, are turned around their axes (rolling power). This rotation is forced by the pressure acting on crankpin 7, the eccentric support of the crankpin in the concentrically supported fly-wheel 10, acting as counterweight to the planetary crankshaft 2. The eccentric support of the crankpin in the concentrically supported plate 20 in mechanism 39 located opposite to the power take-off side compensates for the resulting forces of reaction, the internal gear 31 attached firmly to the housing 1 and an identical gear 32 attached firmly to the mechanism 39, and finally by the torque in the point of contact between the two hob circles of the gears 6 and 31 or 17 and 32, respectively. The centers of the gears 6 and 17 describe a predetermined circle path around the center axis of the construction due to hobbing on the internal gear of the gears 31 and 32, respectively (coupling power). The whole planetary crankshaft 2 including the shaft end 9 as well as the gear 11 to drive the shaft 23 through gear drives 42 and 41, and the gear 21 on the other end of the planetary crankshaft have indeed the same function as the gears 6 and 17. The crankshaft 2 mentioned above makes one full revolution (hob power) while the pistons 4 or 5 move from the top to the bottom dead center; at the same time the crankshaft covers half of its circular path (coupling power). The gear 11 mounted on the shaft butt 9 drives the gear 24 on the driven shaft 23, the latter gear drive acting as a multiplier. However, if the external gear 24 on the driven shaft is replaced by an internal gear, the gear drive becomes a reduction gear.

In mechanism 40 the second connecting rod 22 belonging to the basic kinematic gear moves in a 90° angle relative to connecting rod 3; both connecting rods being coupled together according to the Cardan principle cause a constant rotation of the planetary crankshaft 2.

Figure 7:
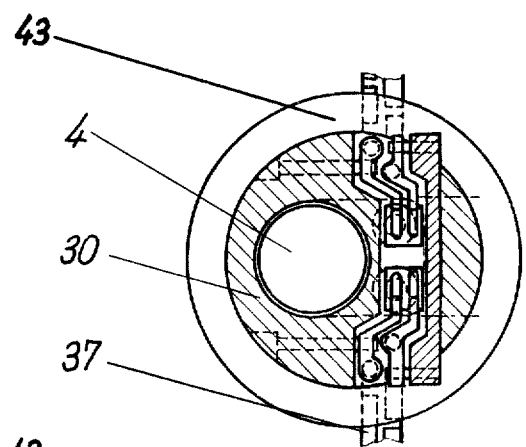
FIG. 7 is a sectional view taken on line VI—VI in FIG. 3.
Figure 8:
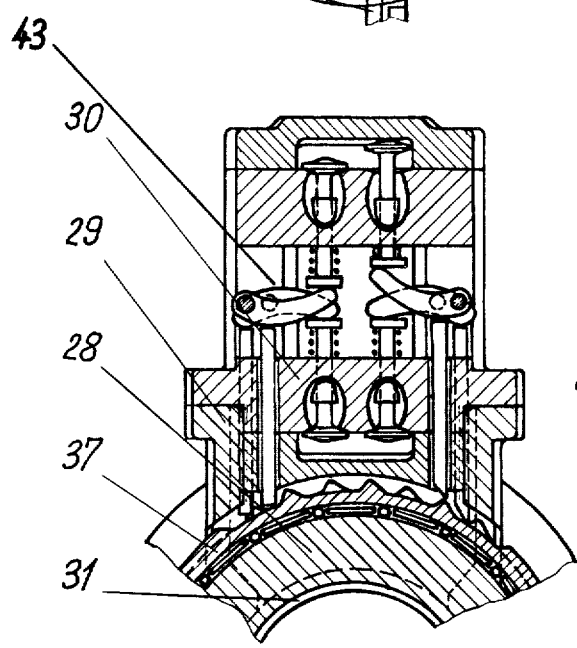
FIG. 8 is a partial sectional view taken on line VII—VII in FIG. 3.

The control mechanism 43 on the opposite side of the power take-off (FIGS. 3, 7 and 8) is driven by the planetary gear 21. The latter drives an external or internal gear 26 (not shown in the drawing) fixed on shaft 25 which in turn drives the ring 37 for the valve control by a chain drive and the shaft 38.

Figure 9:
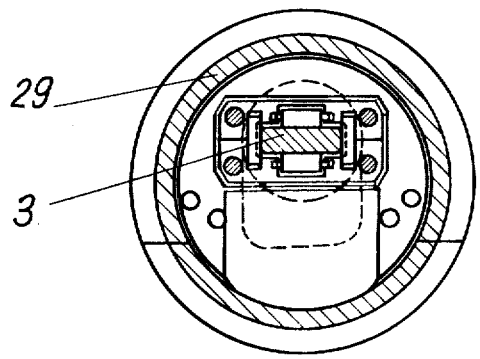
FIG. 9 is a sectional view taken on line VIII—VIII in FIG. 4.

The advantage of the design of this crank gear according to the invention is its compactness and its need for relatively little space. Because of the straight line movement of the connecting rods 3 and 22, they can be supported and sealed with gasket rings (see FIGS. 3 and 9), thus allowing two-sided operation of the piston. When supporting the connecting rods 3 and 22, the pistons can be of short design, and because of the absence of any torques they impose no pressure onto the cylinder walls. If one of the piston pairs is in one of the dead centers the other piston pair applies its maximum torque on the crankshaft. This results in a very quiet operation of the mechanism. Moreover, the drive according to the invention can be employed in all cases where a high speed rotation has to be converted into a straight line movement because the movement of the pistons follows a constant, regular sinusoidal curve when driven uniformly.

Figure 10:
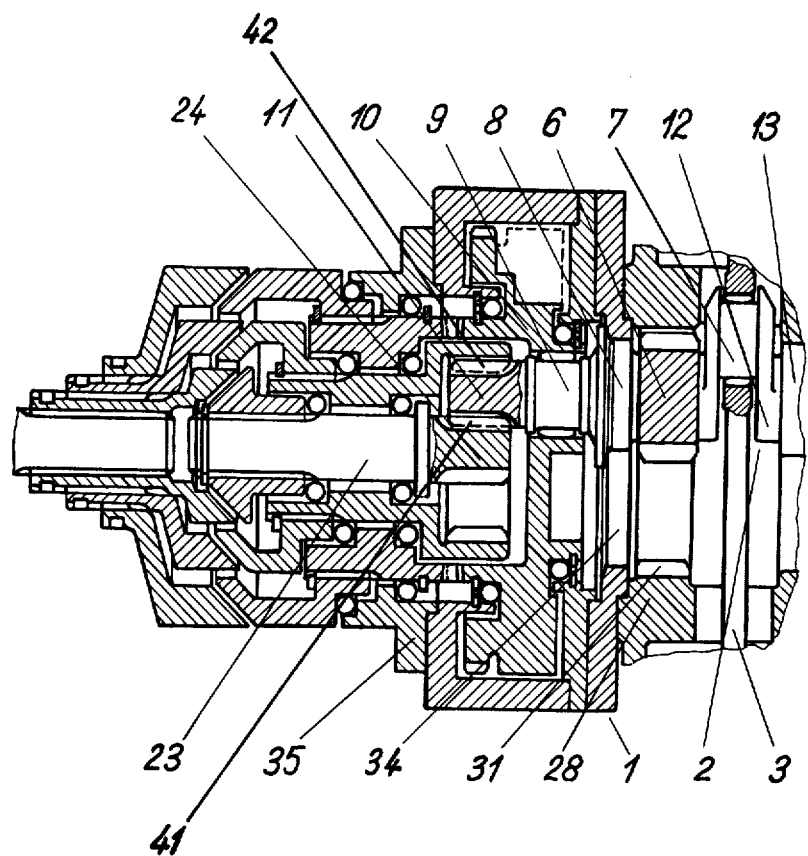
FIG. 10 is a sectional view according to line II'—II', analogous to line II—II in FIG. 1, showing a modified crank gear of the invention.

The crank gear according to the invention allows the combination of the two types of operations by using concentrically mounted driven shafts, i.e., by having a toothed shaft butt in the center and an internal gear mounted on a concentrically, separately supported shaft yielding a speed ratio of 9:1. This design opens new ways of further development as shown in FIG. 10. This design allows for a constant tangential force, too, provided that the piston is exposed to a constant pressure, i.e., the first pair of pistons follows a sine curve and the second pair follows a cosine curve, thus the sum of the two piston pairs is $\cos^2\alpha + \sin^2\alpha = 1$.

When operated in reversed direction the mechanism according to the invention can be used as a piston pump, thus producing a noninterrupted stream with uniform pressure of the medium pumped.

The mechanism according to the invention also minimizes the friction of the pistons on the cylinder walls thus avoiding additional heating of the motor. The pistons on both sides of the drive act as one unit because the explosions and compressions are included in one and the same motion.

A tabular listing of the component parts of the system is as follows:

| Basic Kinematic Gear | |
|---|---|
| housing | 1 |
| planetary crankshaft | 2 |
| connecting rod | 3 |
| piston | 4 |
| piston | 5 |
| internal gears | 31 |
| shaft butt | 9 |
| eccentric fly-wheel | 10 |
| driven shaft | |
| Mechanism (39) to Absorb the Resulting Forces of Reaction | |
| gear | 17 |
| guide wheel | 18 |
| shaft butt | 19 |
| plate | 20 |
| gear | 21 |
| center part | 28 |
| adapters | 29 |

| | |
|---|---|
| cylinder | 30 |
| openings for the connecting rods | 3 or 22, respectively |
| gear | 32 |
| guide ring | 33 |
| guide ring | 34 |
| housing | 1 |
| cover | 35 |
| cover | 36 |

Mechanism (40) of the Second Connecting Rod for the Complete Uniformity of the Driving Power

| | |
|---|---|
| crank web | 12 |
| guide wheel | 13 |
| crankpin | 16 |
| pair of webs | 14 and 15 |
| connecting rods | 22 |

Gear Drive (41) or (42) for the Driven or Driving Shafts, Respectively

| | |
|---|---|
| gear | 11 |
| gear | 24 |

Gear Drive (43) for Valve Control

| | |
|---|---|
| planetary gear | 21 |
| shaft | 25 |
| cam ring | 37 |
| shaft | 38 |
| gear | 26 |

I claim:

1. A crank gear for converting linear motion of at least two connecting rods arranged in a 90° relationship to each other and coupled together according to the Cardan principle into rotary motion comprising, a housing, an internal gear fixed within the housing, an eccentric planetary crankshaft within said housing, a crankpin on said crankshaft journaling each of said connecting rods, an external gear rigidly secured on said crankshaft which hobs with said internal gear, a guide wheel having a diameter equal to the pitch diameter of said external gear and concentric therewith, a flange on the guide wheel secured to said external gear, a butt shaft secured to and extending coaxially from said guide wheel, a flywheel eccentrically mounted on said butt shaft, means fixed to said housing concentric with said internal gear and surrounding said flywheel for journaling the flywheel and supporting said butt shaft, and gear means on the end of said butt shaft for take-off of power.

2. A crank gear as defined in claim 1 and further including reduction gear means in said housing in driven relation with the gear means on the butt shaft.

3. A crank gear as defined in claim 1, and further including engine valve means in driven engagement with said crankshaft on the end opposite said butt shaft power take-off.

4. A crank gear as defined in claim 1, and further including means for absorbing the resulting forces of reaction of the kinematic crank gear, said means comprising elements mounted on said crankshaft on the side thereof opposite said butt shaft, said elements including a second external gear rigidly secured on said crankshaft, a second guide wheel, a flange on the second guide wheel secured to said second external gear, and a second butt shaft secured to and extending coaxially from said second guide wheel.

* * * * *